United States Patent [19]

Olschefski

[11] 4,266,346
[45] May 12, 1981

[54] METHOD AND APPARATUS FOR GAGING

[75] Inventor: Robert D. Olschefski, Wixom, Mich.

[73] Assignee: N.B.E. Corporation, Walled Lake, Mich.

[21] Appl. No.: 156,826

[22] Filed: Jun. 5, 1980

[51] Int. Cl.³ .......................... G01B 7/12; G01B 7/31
[52] U.S. Cl. ............................. 33/174 Q; 33/174 L; 33/178 R; 33/178 B
[58] Field of Search ............ 33/174 Q, 178 R, 178 E, 33/178 B, 169 C, 174 L, 172 D

[56] References Cited

U.S. PATENT DOCUMENTS

| | | | |
|---|---|---|---|
| 2,739,389 | 3/1956 | Carter | 33/174 L |
| 3,100,349 | 8/1963 | Stresau | 33/178 R |
| 3,241,243 | 3/1966 | Speer | 33/174 L |
| 3,826,011 | 7/1974 | D'Aniello | 33/172 D |

FOREIGN PATENT DOCUMENTS 186140 9/1967 U.S.S.R. ................ 33/174 Q

Primary Examiner—Willis Little
Attorney, Agent, or Firm—Krass, Young & Schivley

[57] ABSTRACT

A method and apparatus are disclosed for gaging the diameter and axis position of circularly shaped part features, such as bores, bosses, etc., consisting of an arrangement for orbiting a probe interfit with the feature to be gaged, the probe adapted to be wobble rotated while in contact with axially spaced locations on the feature. The orbital motion of a probe extension is measured to provide an indication of oversize conditions and/or an out-of-position axis. The wobbling rotation of the probe is achieved by orbital drive of a support plate which is resiliently interconnected with one or more probes to wobble each of the probes, enabling simultaneous gaging of several features. Various special arrangements are disclosed for gaging blind holes, bores of very shallow depth and male features.

22 Claims, 8 Drawing Figures

METHOD AND APPARATUS FOR GAGING

BACKGROUND ART

This invention concerns gaging and more particularly gaging of female and male circular features such as bores, bosses and the like, which gaging of the diameter as well as axis position is required. Diameter gaging of bores is commonly done with insert plugs of various size which detect undersize or oversize conditions to determine the axis of bores. Axis positon is commonly achieved by an arrangement in which a rotatable mandrel is positioned in the bore and rotated in order to determine if the axis of rotation of the mandrel is in the location of the correct location of the bore axis within tolerance limits.

A further approach to such gaging problem has involved placing a probe rotated within the interior of the bore or in contact with the exterior of the rounded features such as a boss or shaft. By the use of electrical transducers, such as LVDT's, electronic signals may be generated and processed to determine the various gaging information necessary to generate a "reject" or "accept" gaging signal indication.

In these various approaches, the precision of fit of the various mechanical parts, such as bearings, is critical in reliably obtaining accurate results.

In many applications, a number of such features such as bores, shafts, bosses, etc., may be required to be gaged on a single workpiece and in these cases the fixturing becomes relatively elaborate requiring relatively costly gaging set-ups and a timeconsuming gaging process. This is particularly true if each gaged feature must be gaged separately for inside and outside diameter and also for axis position and alignment.

Accordingly, it is an object of the present invention to provide a method and apparatus for gaging circularly shaped features such as bores, bosses, hubs, and the like, in which the gaging apparatus is substantially simplified.

It is yet another object of the present invention to provide such method and apparatus in which precision bearing and other mechanical components are not required in order to reliably and precisely gage inside and outside diameters, as well as axis alignment and positioning.

It is still another object of the present invention to provide such method and apparatus in which a number of gage parameters may be simultaneously obtained with a single gaging step.

It is still a further object of the present invention to provide such a method and apparatus for gaging in which a number of features may be so gaged simultaneously during a single gaging process.

SUMMARY OF THE INVENTION

These and other objects of the present invention, which will become apparent upon a reading of the following specification and claims, are achieved by the use of an elongated gaging probe having a section adapted to be interfit with the gaged feature with a clearance space, so as to be able to be tilted with at least one point of contact with the gaged feature surface. The probe is then caused to undergo wobbling rotation while being maintained in contact with the gage feature surface so that the degree of wobble is defined by the constraint of the contact of the probe with the feature surface. The wobbling rotation is induced by an orbital support plate resiliently connected to one end of the probe surface.

The probe also has an extension section, each plane of which moves through an orbital excursion, the extent of which movement being measured with suitable distance transducers such as LVDT's contacting the probe extension so as to detect the extent of movement along each of the orthogonal axes lying in a plane of orbital motion.

The gaging set-up is periodically calibrated by use of a master part having a nominally sized feature of the type to be gaged. Upon orbiting of the probe in contact with the feature to be gaged, gaging signals are generated which therefore correspond to the acceptable excursion of the probe extension.

The extent of orbital excursion is in correspondence with the inside and outside diameter of the feature, while the position and tilt of the axis of the feature are gaged to thereby simultaneously enable determination of the acceptability of all of these parameters.

In the instance where the gaged feature is a bore, the probe takes the form of an undersized probe shaft adapted to contact the side surface of the bore at axially spaced points. The probe shaft is resiliently coupled to an orbital support plate which is driven by a suitable orbital drive through an orbit of great enough radius to insure maintenance of the contact of the probe shaft within the gaged bore.

The resilient connection allows the connected probe shaft to undergo orbital motion of lesser excursion as constrained by its contact with the gaged bore.

In the case of through holes, the orbital support plate is positioned beneath the bore and the probe shaft extension extends beyond the bore for a distance giving a suitable mechanical amplification of the motion in order to maximize the sensitivity of the gaging set-up.

In the case of a blind hole, the support plate is advantageously positioned above the hole intermediate the shaft extension.

This arrangement is also adapted to provide gaging of bores and other features of relatively shallow depth by the provision of a fixture plate, having a circular feature and located at an axially spaced location from the gaged bore, with which the probe is maintained on one of the contact points. The other contact point is with the gaged bore interior surface.

The orbital motion will detect the gaged parameters in the same fashion as with the probe shaft in contact with axially spaced points on the surface of the gaged feature itself.

The probe may also have a gage section configured to gage male features such as hubs and bosses by being provided with a hollow cylindrical portion having axially spaced contact rings which are adapted to gage the outer surface thereof at the axially spaced positions. The orbital motion then generates signals from the distance transducers from which it may be determined if the male feature is within tolerance limits for the diameter size and also the axis alignment, as in the above-described arrangements.

This system also enables the simultaneous gaging of a number of separate features due to the resilient interconnection of the probes with the orbital support plate. That is, the orbital support plate may support a number of such probes causing each of them to undergo orbital motion of different radii, the resilient connections allowing this difference in motion to be accommodated.

Suitable processing electronics may be associated with the transducer output signals to perform the various gaging functions.

For example, the gaging electronics may compensate for misalignment of the workpiece and gaging fixturing by detecting a tilted condition of a number of the feature axes so that such tilt may be electronically compensated for during the gaging process.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
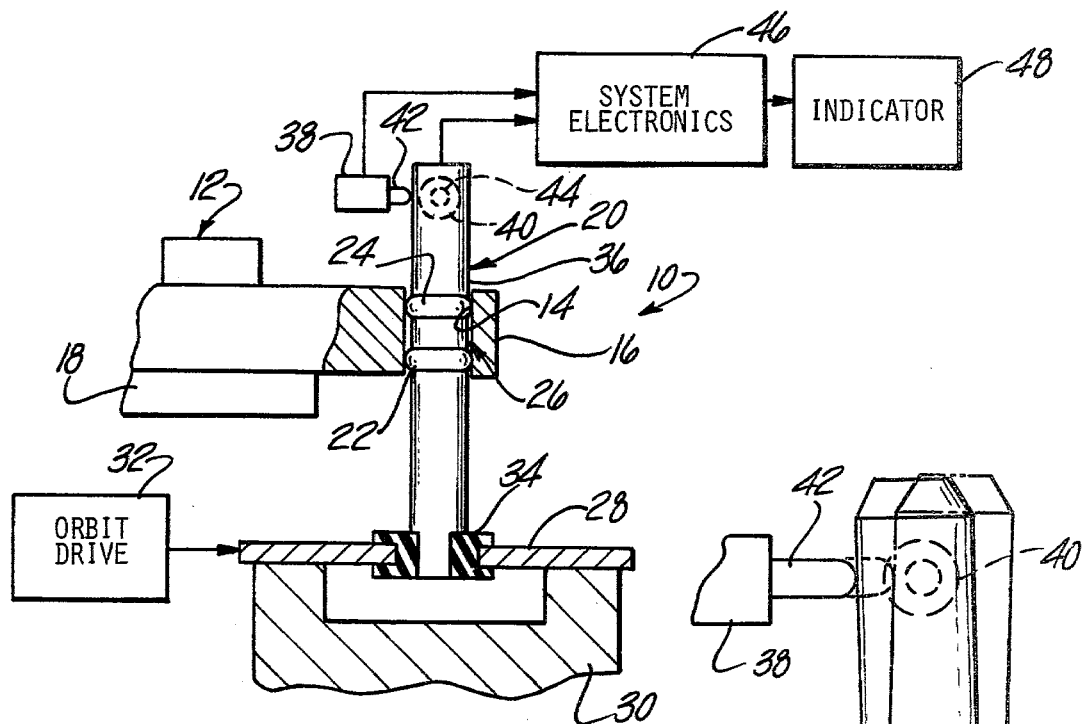
FIG. 1 is a diagrammatic representation of the gaging apparatus according to the present invention shown with the gaging probe in the entrance or centered position.

Referring to FIG. 1, the gaging apparatus generally indicated at 10 according to the present invention is adapted to gage certain parameters of circularly shaped features on a workpiece 12. In FIG. 1, the feature comprises a through bore 14 formed in a flange 16 of a typical workpiece 12.

The workpiece 12 is adapted to be mounted on gage fixturing, indicated at 18, so as to properly orient and securely support the same in a predetermined position with respect to the other components of the gaging apparatus.

The gaging apparatus 10 further includes a probe shaft 20 for the gaging of through holes or bores which is provided with an undersized intermediate contact section 26 adapted to be interfit with the bore 14 with a suitable clearance space therebetween. The probe shaft includes hardened spherically-shaped contact rings 22 and 24 which are axially spaced along the length of an intemediate contact section 26 of the probe shaft 20.

In FIG. 1, the workpiece 12 has been placed over the probe shaft 20 in the centered or entrance position. That is, in the initial position, the probe shaft 20 is positioned as will be described hereinafter such as to be in generally parallel alignment with the axis of the bore 14, in order to enable the workpiece 12 to be emplaced over the probe contact section 21.

The distance between the contact rings 22 and 24 is selected to be less than the distance comprising the axial depth of bore 14 such that the contact rings 22 and 24 are capable of contacting axially spaced, diametrically opposed points on the bore 14 when tilted during wobbling rotation of the probe 20, as will be described herein.

The contact rings 22 and 24 are hardened to insure minimal wear thereof and also are spherically shaped to insure that probe shaft 20 tilt does not appreciably increase the axial spacing of the contact rings 22 and 24 to minimize the effect of variations in diameter of the bore 14 on the gaging process.

The probe shaft 20 is supported on an orbital support plate 28 positioned beneath the intermediate probe contact section and is connected to the lower end section of the probe as shown. The connection between the orbital support plate 28 and the probe shaft 20 comprises a resilient coupling means which supports the probe shaft 20 vertically and causes the probe shaft 20 to move together with the movement of the orbital support plate 28, but accommodates a certain degree of relative motion therebetween. This will occur if the orbital motion of the orbital support plate 28 is greater than the corresponding motion allowed by the constraint afforded by contacting of the contact rings 22 and 24 with the interior of the through bore 14.

The orbital support plate 28 is supported on a suitable platform 30 such as to be maintained in a horizontal position throughout the orbital motion thereof. Such orbital motion is produced by an orbital drive indicated in diagrammatic form at 32, which may be any of a number of known mechanical drives such as an eccentric drive.

The orbital support plate 28 is adapted to be driven to a center position lying on the axis of orbital motion induced by the orbital drive 32. This perpendicularly orients the probe shaft 20 to allow the workpiece 12 to be placed on the probe shaft 20 as shown in FIG. 1.

The extent of motion of the orbital support plate 28 is, as noted, arranged to be greater than the corresponding constrained motion resulting from the contacting of the contact rings 22 and 24 with an oversized condition of the through bore 14 such that the orbital support plate 28 will overtravel that excursion of the probe shaft 20. Accordingly, some deflection of the resilient bushing 34 will normally take place.

The probe shaft 20 also includes an end section comprising an axially extending probe extension 36 spaced from the contact section 26 and above the orbital support plate 28.

The length of the probe extension 36 is selected to be greater than the distance to the upper contact ring from the center of the wobble rotation. That is, the center point between the contact rings 22 and 24. This is to provide a mechanical amplification of the corresponding orbital motion of the probe extension 36 over that experienced by the contract rings 22 and 24, respectively. A 5:1 ratio may be advantageously employed to enable precise measurement of the variations in part size and geometry by measurement of the orbital motion of the probe extension 36.

The extent of orbital motion of an upper portion of the probe extension 36 is therefore measured by suitable displacement transducing means. Such transducing means provide corresponding electrical gaging signals to the X and Y orthogonal components of such motion in a plane transverse to the axis of the hole of each. This may be achieved by two or more LVDT transducers, one transducer 38 lying along an orthogonal axis to the other transducer 40 and having contact rods 42 and 44 each lying in the measurement plane in contact with the outside surface of the probe extension 36. Thus, each contact rod 42 and 44 is displaced with X and Y motion of the section of the probe extension 36 lying in the plane of measurement of the LVDT transducers 38 and 40, respectively, and generates corresponding electrical signals.

These electrical output signals are processed in suitable system electronics indicated diagrammatically at 46 which in turn may generate reject or accept signals, in turn triggering a suitable indicator 48 in suitable fashion.

Such system electronics and transducers and indicators are very well known to those skilled in the gaging art and accordingly a detailed description of these components is not here included.

Figure 2:
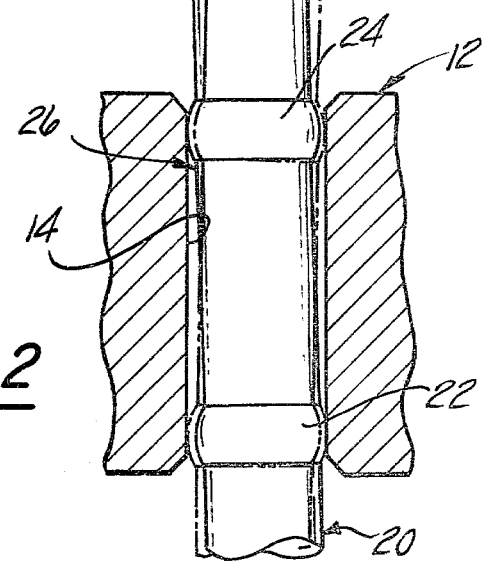
FIG. 2 is a diagrammatic representation of FIG. 1 with the probe being orbited in contact with the gaged feature.

The transducers 38 and 40 will be mounted on suitable fixturing enabling their removal and replacement to accommodate the acceptance of the workpiece 12 over the probe shaft 20. Accordingly, after placement of the workpiece 12 over the probe extension 36, the orbital drive is activated. As noted, a lesser orbital motion of the probe shaft 20 results than that allowed by the constraint of the contact rings 22 and 24 and that urged by the orbital drive mechanism 32. This causes the contact rings 22 and 24 to be forced into engagement with the through bore 14 interior surface at axially spaced points and driven about in a wobbling rotational motion indicated in FIG. 2. This results in orbital motion of each point on the probe shaft 20 in planes normal to the bore axis.

Figure 3:
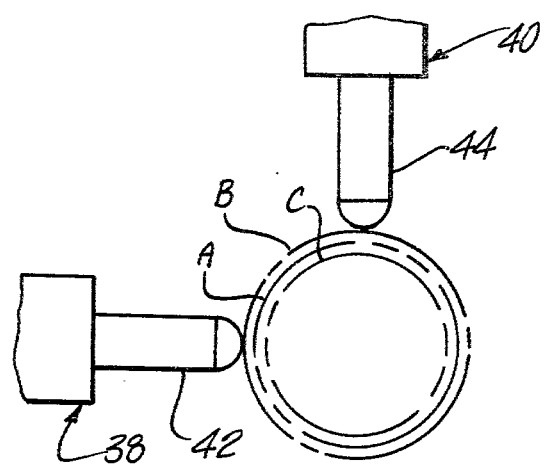
FIG. 3 is a diagrammatic representation depicting the probe extension orbital motion in the plane of the gaging transducers and its relationship to the diameter of the gaged feature.

Referring to FIG. 3, the varying orbital motion in the plane of the LVDT transducers 38 and 40 for undersized, oversized and nominal diameter bores are represented by circles A, B and C, respectively.

Initially, a master part is placed on the gage fixture 18 and the orbital drive mechanism 32 activated causing the probe shaft 20 to be orbited through the orbit created by the constraint of contact rings 22 and 24 with the inside diameter of the through bore 14.

The resultant orbital motion in the plane of the LVDT transducers 38 and 40 is depicted by the circle A in FIG. 3. For subsequently tested or gaged workpieces, if the bore 14 is oversized, the orbit radius will be greater due to the increased tilt of the probe shaft 20 as it undergoes its orbital motion. This is represented by circle B in FIG. 3 and will be read by either the LVDT transducer 38 or 40 as indicating an out-of-balance tolerance oversized part with the reject indicator being thus subsequently activated.

If the through bore 14 is undersized, the orbital motion of the probe extension 36 will be reduced at the plane of the LVDT transducers 38 and 40 as represented by circle C and accordingly either transducer 38 or 40 will read an increased X and Y reading, respectively, to enable detection of an undersized unacceptable workpiece.

Figure 4:
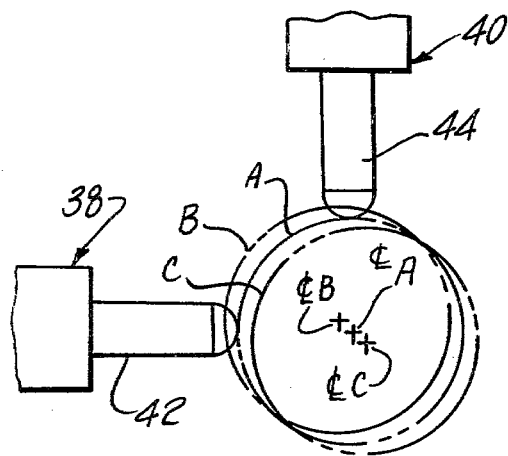
FIG. 4 is a diagrammatic representation of an orbital motion probe extension in the plane of the gaging transducers and its relationship to the position of the feature axis.

Referring to FIG. 4, the effect of mispositioning of the axis of the through bore 14 on the orbital motion can be appreciated. The orbital motion produced with the master part is indicated in circle A and is centered on the point of crossing of the lines of motion of the contact rods 42 and 44 of the LVDT transducers 38 and 40, respectively.

If the axis is offset along either the X or Y axis in either direction, as represented by circles B and C, this varies the position of contact rods 42 and 44, respectively, and accordingly a non-true position of the bore axis can be detected to develop an accept/reject indication by the system electronics.

Accordingly, a simultaneous gaging of the undersized or oversized condition and the bore axis position is achieved by this arrangement.

It is often the case to require gaging of the diameter and axis position of a number of such circularly shaped features on a single workpiece.

The concept according to the present invention enables an arrangement to be provided in which such gaging of a number of features may be carried out simultaneously due to the relative motion which is allowed between the orbital support plate 28 and the probe shaft 20 by virtue of the resiliency of the bushing 34.

Figure 5:
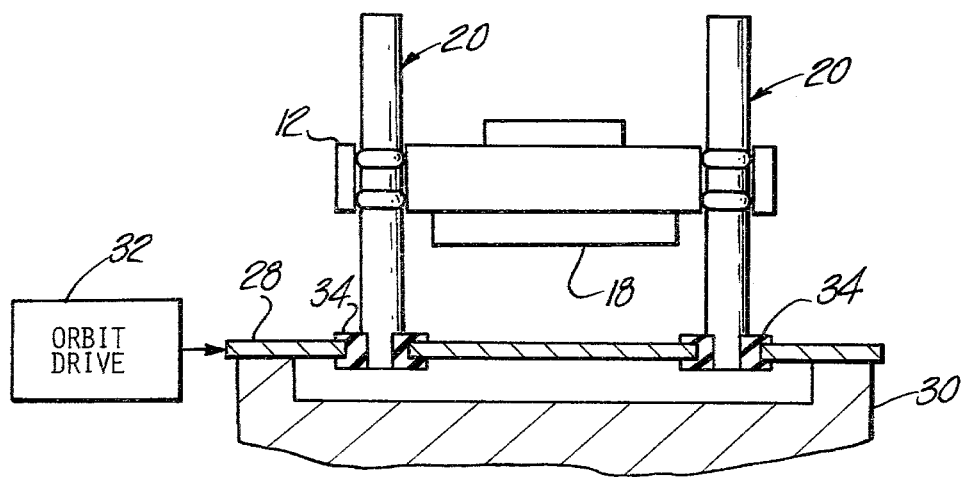
FIG. 5 is a diagrammatic representation of the general type shown in FIGS. 1 and 2 depicting the gaging of a plurality of bores in a workpiece simultaneously by the use of multiple probes each supported by a single orbital support plate.

Such an arrangement is depicted in FIG. 5 in which a plurality of probe shafts 20 are carried by the orbital support plate 28, all drivingly connected thereto by means of a resilient coupling consisting of bushings 34. The orbital drive 32 thus simultaneously causes all of the probes to undergo the required wobbling rotation.

The orbital motion of each of the lower ends of the probe shaft 20 is of a radius which is intended to be produced by the orbital drive mechanism and greater than that which is allowed by the constraint imposed by contact of the contact rings 22 and 24 with the bores gaged. Thus, each probe is caused to undergo a wobbling motion defined by the constraint imposed by the irrespective contact points as the probes are moved around the interior of each of the bores 14 to be gaged.

In some instances, it may be necessary to gage bores which are of limited depth, such that the contact with spaced points on the bore would produce an excessive tilt or wobble of the probe reducing accuracy of the gaging process or rendering the arrangement impractical due to space requirements.

Figure 6:
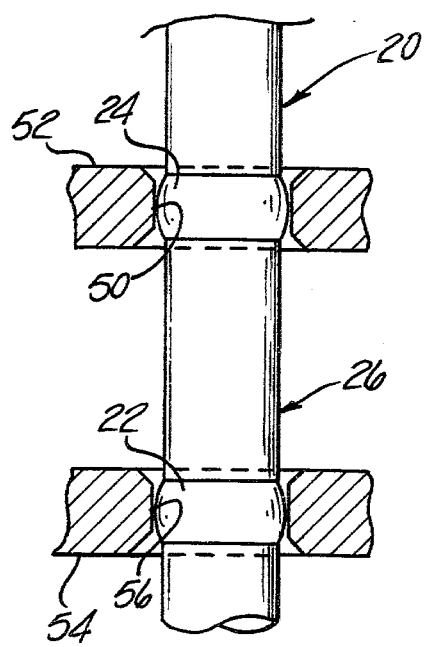
FIG. 6 is a diagrammatic representation of a gaging apparatus of the type shown in FIG. 1 specially configured to gage a bore of relatively shallow depth.

In such instances, an axially spaced fixture plate 54 is utilized, providing one of the two contact points. Such an arrangement is depicted in FIG. 6. In this instance, the bore 50 and workpiece 52 are of relatively shallow depth.

Accordingly, a fixture plate 54 is provided mounted to the gage fixturing 18 which remains in a fixed position and which is provided with a precisely sized bore 56 located at an axially spaced position in nominal alignment with the bore 50 to be gaged.

Accordingly, the probe shaft 20 may be orbited as before with the contact rings 22 and 24 in contact with the bore 50 to be gaged and with the interior of the bore 56 in the fixture plate 54. The results will be as before, i.e., the transducers will be able to detect both undesize and oversize conditions and also out-of-position of the bore axis as described above.

This gaging concept is generally applicable to features which are circularly shaped and which may take the form of female features such as bores as described above and also may be applied to male features such as hubs, bosses, etc. For gaging of male features, the probe shaft 20 must be configured to be interfit with the feature such as to be able to be tilted so as to come into contact with the outside diameter of the feature and cause it to undergo a wobbling motion, while remaining in contact therewith. In similar fashion to the above embodiments, the variation in motion of the probe extension would provide an indication of undersize/oversize condition, as well as an out-of-position axis.

Figure 7:
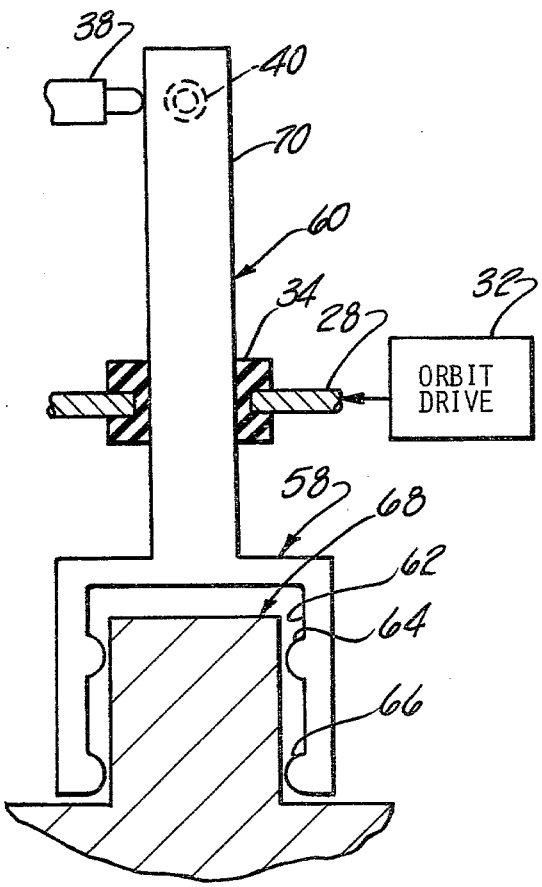
FIG. 7 is a fragmentary view of a probe adapted to engage the outside surface of a circularly shaped male feature.

Such an arrangment is depicted in FIG. 7. In this case, the lower portion 58 of a probe 60 is provided with a hollow cylinder having an internal bore 62 formed therein with axially spaced contact rings 64 and 66 provided on the inside diameter of the cylinder bore 62. The inside diameter across the contact rings 64 and 66 is such as to be received over the boss 68 diameter with a predetermined clearance thereover such as to provide a slight degree of tilt of the probe upon movement into contact of the contact rings 64 and 66 at axially spaced contact points along the length of the boss 68.

In this case, the orbital support plate 28 is positioned above the lower portion 58 of the probe shaft and the extension 70 extends above the orbital support plate 28.

In similar fashion to the above-described embodiments, LVDT transducers 38 and 40 are located to measure motion of the probe extension 70 in a plane above the contact rings 64 and 66.

Upon orbiting of the orbital support plate 28 by the orbital drive 32, the resultant wobbling of the probe 60 causes an orbital motion of the probe extension 70 which is gaged by the LVDT transducers 38 and 40. This yields a gaging indication due to the variatios in radius of the orbital motion of the probe 60 at the plane of the LVDT transducers 38 and 40 compared with the radius of motion with a master part in place and thus a determination as to whether the size and axis of a part is acceptable or unacceptable.

Figure 8:
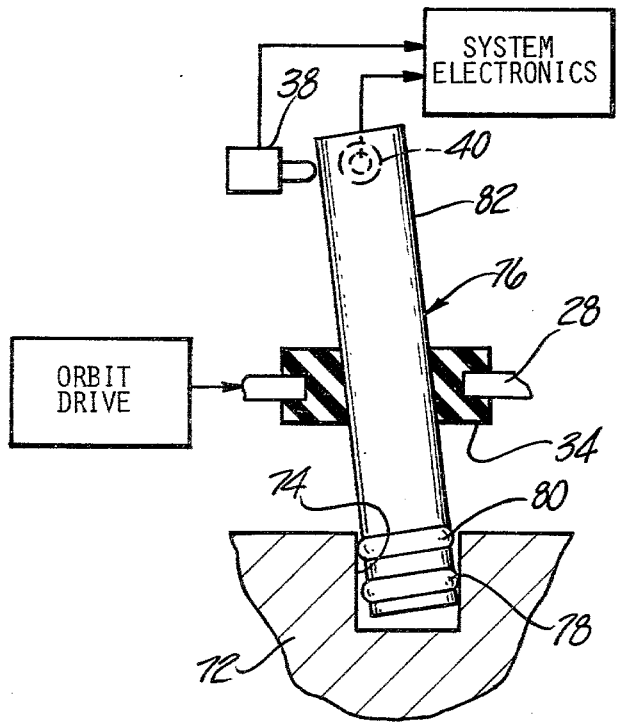
FIG. 8 is a diagrammatic representation of a gaging system of the type shown in FIG. 1 adapted to provide gaging of a blind hole.

The arrangement shown in FIG. 7 may also advantageously be utilized in order to provide gaging of the blind hole as indicated in FIG. 8. Here the workpiece 72 is formed with a blind hole 74 to be gaged. In this case, the probe shaft 76 has its lower end extending into blind hole 74 with spaced contact rings 78 and 80 being located such as to produce the corresponding contact at axially spaced points along the length of the blind hole 74.

The probe shaft 76 is in this case mounted to the orbital support plate 28 at a point above the workpiece 72, retained with the resilient bushing 34. An orbital drive 32 is provided as before, as well as an upper probe shaft extension with LVDT transducers 38 and 40 provided to generate gaging signals corresponding to the orbital motion in each of the X and Y axes at the plane of the LVDT transducers.

As is well known to those skilled in the gaging art, the electronics associated with such gaging set-ups can provide a great degree of flexibility in the processing of the signals in order to generate the various gaging uses of the LVDT signals.

For example, such signals can be processed in order to detect the condition of the workpiece 84 not properly seated on the gage fixture 18 so as to be tilted at an angle with the upper surface of the gage fixture 18.

In this case, the comparator circuit means (not shown) may detect such condition if each of a plurality of bores or boss sections 14 or 68, respectively, all exhibit a mispositioning of the axis.

In this case, electronics may be designed to subtract the effects of such tilt automatically from the readings achieved by the probes associated with each feature to thereby eliminate the effects of such mispositioning of the workpieces in the gaging fixturing.

Accordingly, it can be seen that the gaging apparatus and methodology is broadly applicable to gaging features or workpieces of widely differing configurations, i.e., internal bores of substantial depth, bores of relatively thin depth, blind holes and male features such as bosses and hubs. In addition, the method and apparatus is applicable to simultaneous gaging of a number of such features during a single gaging process.

It is also noted that the gaging methodology produces a simultaneous gaging of a number of out-of-tolerance conditions of such features. That is, the undersize/oversize condition and the axis out-of-alignment condition.

At the same time, it can be appreciated that the apparatus involved is relatively simple and reliable and does not involve complex or precision components. The orbital motion of the orbital support plate need only be greater than the constrained motion of the probe and does not required precise controls.

In addition, the probe shaft itself is not required to be precisely dimensioned since wear of the contact rings and other portions thereof is simply and easily updated with each use of the master part. That is, updated LVDT transducer signals may be generated from the master part after a given number of gaging cycles requiring a recalibration of the apparatus.

The embodiments of the invention in which an exclusive property or privilege is claimed are defined as follows:

1. A method of gaging a feature of circular shape on a workpiece, the method comprising the steps of:
   interfitting a circularly-shaped contact section of an elongate probe over said feature with a clearance space therebetween;
   causing said probe to undergo a wobbling rotation, said wobbling rotation being constrained in part by contact with the surface of said gaged feature;
   measuring the motion of a probe extension section axially displaced from said contact section along orthogonal axes in a plane normal to the axis of said feature as said probe undergoes said wobbling rotation;
   whereby said motion thereof along said orthogonal axes varies in accordance with the diameter of said gaged feature and with said axis position of said gaged feature due to the constraint of said contact section with said surface of said gaged feature to thereby establish a measurement of the diameter and axis position of said gaged feature.

2. The method according to claim 1 wherein said probe extension further includes a second axially spaced, circular contact section and further including the step of constraining said second contact section thereof to move in a circular path during wobbling rotation of said probe to thereby define wobbling rotation of said probe by the constraint of said second contact section motion and said contact of said first contact section with said gaged feature surface.

3. The method according to claim 2 wherein in said step of causing wobbling rotation of said probe, said first and second contact sections of said probe are maintained in engagement with axially spaced diametrically opposed points on said gaged feature, whereby said orbital motion of said probe is constrained by contact with said feature surface.

4. The method according to claim 2 wherein said step of constraining said wobbling motion of said probe by constraining the motion of said second contact section includes the step of positioning a fixture plate having a feature nominally the same as said gaged feature in an axially spaced position aligned with said gaged feature, at a location corresponding to said location of said second contact section on said probe; and, wherein in said constraining step said second contact section of said probe is maintained in contact with the surface of said fixture plate feature throughout said wobbling rotation of said probe, whereby said constraint is achieved by contact of said first section with said surface of a gaged feature and said contact of a second contact section with the surface of said fixture plate feature.

5. The method according to claim 2 wherein said step of causing said wobbling rotation of said probe includes the step of orbiting a support plate carrying said probe in a plane orthogonal to said axis of said gaged feature.

6. The method according to claim 5 wherein said step of wobbling said probe by orbiting motion of said support plate includes the step of resiliently coupling said probe to said orbital support plate and driving said orbital support plate in an orbital motion greater than the degree of orbital motion corresponding to the constrained wobbling rotation of said probe.

7. The method according to claim 6 further including the steps of simultaneously gaging a plurality of gaging features, said step including the step of providing a probe for each of said plurality of gaging features, each interfit with said feature with a clearance therebetween and further including the step of orbiting each of said probes about an axis aligned with the axis of said features, said wobbling rotation constrained in part by contact of a circular contact section on each of said probes, in contact with the surface of said gaged features; and further including the step of measuring the motion of a section of said probe axially spaced from said contact section in a plane transverse to said axis of said probe feature along orthogonal axes, said orbiting step including the step of supporting all of said probes on an orbital support plate and resiliently coupling said probes to said orbital support plate and moving said orbital support plate through an orbital motion having a greater radius than that corresponding to any of the constrained wobbling motion of each of said probes.

8. THe method according to claim 1 wherein said gaged feature comprises a circularly shaped bore and wherein said probe comprises an elongated shaft sized to be interfit within said bore with said clearance therebetween.

9. The method according to claim 1 wherein said gaged feature comprises a circular projection and wherein said elongate probe includes an engagement section comprised of an interior bore adapted to be fit over said porjection with a clearance space therebetween and including said first contact section disposed about the interior surface circumferentially of said interior bore.

10. The method according to claim 1 further including a calibrating step wherein a master is formed with nominally dimensioned feature in correspondence with said gaged feature, positioning said probe extending into interfitting engagement therewith, moving said probe through said constrained orbital path by contact with said master feature and measuring said orbital motion of said probe extension, whereby the calibrating of said measurement process is carried out.

11. The method according to claim 1 wherein said step of positioning said probe in said interfitting engagement with said gaged feature includes the step of implacing said workpiece onto a locating fixture and wherein said measurement step measuring said orbital motion of said probe extension includes the step of measuring said orbital motion relative to said fixture, whereby shifts in said orbital axis with respect to said workpiece located in said fixture may be determined.

12. A gaging apparatus for forming gaging operations on a circularly shaped feature of a workpiece, said apparatus comprising:
an elongate probe, said probe including a circular contact section adapted to be interfit within said gaged feature with a clearance space therebetween to enable tilting of said probe with respect to said gaged feature axis;
means positioning said probe with respect to said gage feature such as to position said contact section into engagement with the surface of said gaged feature to be gaged;
means for causing wobbling rotation of said probe, said means including means constraining said wobbling rotation of said probe by said contact of said contact section of said probe with said surface of said gaged feature;
said probe further including a probe extension section axially extending from said contact section and further including displacement transducer means generating output signal in correspondence with the orbital motion of said probe extension caused by wobbling rotation of said probe in a plane transverse to said axis of said gaging feature;
whereby said displacement transducer means provides output signals corresponding to the variation in diameter of said gaging feature and said position of said axis of said gaged feature.

13. The gaging apparatus according to claim 12 wherein said means constraining said probe while undergoing said wobbling rotation further includes a second contact section carried by said probe and means causing constraint of orbital motion of said second contact section, whereby said first and second contact sections constrain said wobbling rotation of said probe.

14. The gaging apparatus according to claim 13 wherein said second contact section is disposed axially offset from said first contact section and said probe extension.

15. The gaging apparatus according to claim 14 wherein said means for constraining said orbital motion of said second contact section comprises dispositing a second circularly shaped feature axially aligned with said gaging feature at said axially offset locations of said second contact section, wherein said second contact section is urged into contact with said second circular feature and caused to orbit thereabout in contact with the surface thereof, whereby said wobbling motion of rotation of said probe is defined by said contact of said first and second contact sections with said surfaces of said gaging feature on said offset feature.

16. The gaging apparatus according to claim 15 wherein said means causing said wobbling movement of said probe further includes an orbital support plate carrying said probe at a point thereon axially offset from said first and second contact sections of said probe extension; further including resilient coupling means connecting said probe and said orbital support plate accommodating limited relative movement with respect to each other in a plane parallel to the plane of said orbital motion of said probe; means driving said orbital support plate in an orbit having a greater radius than that corresponding to said orbital motion of said connected probe portion with said first and second contact sections in contact with said surfaces, whereby said resilient connections accommodate said lesser radius orbital motion thereof, said resilient coupling urging said contact sections into engagement with said surfaces of said gaged and offset features, respectively.

17. The gaging apparatus according to claim 16 wherein said gaging apparatus includes a plurality of said probes supported on said orbital support plate, each of said probes drivingly connected thereto, said means including resilient coupling means associated with each of said probes, whereby said plurality of probes is driven through orbital motion in contact with a plurality of respective gaging features and wherein said resilient couplings accommodate differences in constrained orbital motion of said respective probes.

18. The gaging apparatus according to claim 12 wherein said gaging feature comprises a through bore and said probe comprises a probe shaft and wherein said contact sections comprise spaced spherically shaped contact rings with each of said contact rings extending about the periphery of said probe shaft at axially spaced locations thereon; and wherein said probe is undersized, whereby said wobbling rotation in said through bore is enabled.

19. The gaging apparatus according to claim 12 wherein said probe extension extends axially a greater distance from the center of wobble rotation of said probe and said contact point of said first contact section of said probe from said center of wobble rotation, whereby mechanical amplification of said wobbling motion is enabled measured by said transducer means.

20. The gaging apparatus according to claim 12 wherein said gaging feature comprises a circular projection wherein said probe section is interfit therewith and comprises a hollow cylinder fit over projection with a clearance space therebetween, further including a pair of spaced rings comprising said first and second contact sections axially spaced and mounted to the interior of said cylindrical bore.

21. The gaging apparatus according to claim 13 further including a fixture plate formed with a feature corresponding to said gaged feature, means mounting said fixture plate axially spaced therefrom in axial alignment therewith and means constraining said second contact ring to move through said wobbling motion in contact with said fixture plate feature, whereby said orbital wobbling motion of said probe is constrained by said contact of said first and second contact sections with said gaging feature and said fixture palte feature.

22. The gaging apparatus according to claim 12 wherein said displacement transducer means comprises a pair of orthogonally oriented linear displacement transducers, each having a rod element maintained in contact with the surface of said probe extension lying in a plane orthogonal to the axis of said gaged feature and axially offset therefrom, whereby the orthogonal components of said orbital motion may be sensed thereby and generate signals corresponding thereto.

* * * * *